United States Patent [19]

Kodera

[11] Patent Number: 5,038,025
[45] Date of Patent: Aug. 6, 1991

[54] METHOD OF RECEIVING PROGRAM DOWN-LOADED TO IC CARD AND IC CARD THEREOF

[75] Inventor: Yuji Kodera, Ibaraki, Japan
[73] Assignee: Hitachi Maxell, Ltd., Osaka, Japan
[21] Appl. No.: 478,402
[22] Filed: Feb. 12, 1990

[30] Foreign Application Priority Data

Feb. 15, 1989 [JP] Japan .................................. 1-35902

[51] Int. Cl.⁵ ...................... G06F 15/21; G06K 19/07
[52] U.S. Cl. .................................. 235/492; 235/375; 235/379; 235/380; 902/11; 902/26
[58] Field of Search ............... 235/375, 379, 380, 492; 902/11, 26

[56] References Cited

U.S. PATENT DOCUMENTS

| | | | |
|---|---|---|---|
| 4,614,861 | 9/1986 | Paulov et al. | 235/380 |
| 4,748,320 | 5/1988 | Yorimoto et al. | |
| 4,766,293 | 8/1988 | Stockburger et al. | 235/380 |
| 4,968,873 | 11/1990 | Dethofr et al. | 235/492 |

FOREIGN PATENT DOCUMENTS

| | | |
|---|---|---|
| 0213534 | 3/1987 | European Pat. Off. . |
| 0218176 | 4/1987 | European Pat. Off. . |
| 0275510 | 7/1988 | European Pat. Off. . |
| 0288832 | 11/1988 | European Pat. Off. . |
| 0292248 | 11/1988 | European Pat. Off. . |
| 3720394 | 12/1987 | Fed. Rep. of Germany . |
| 3812147 | 11/1988 | Fed. Rep. of Germany . |
| 63-6690 | 1/1988 | Japan . |

Primary Examiner—Harold Pitts

[57] ABSTRACT

There is provided an IC card comprising a memory within the IC card for storing therein a program operating on a processor included in the IC card and a ROM storing therein a system program for down-leading the program onto the IC card. When a different program is present in the program storage area and a program to be down-loaded into the IC card is to be relocated to a space area, the destination address field of a jump instruction included in the program is altered by a processor included in the IC card.

12 Claims, 8 Drawing Sheets

FIG.8A
PROGRAM BEFORE UPDATE

FIG.8B
DOWN-LOADING OF UPDATED PROGRAM

METHOD OF RECEIVING PROGRAM DOWN-LOADED TO IC CARD AND IC CARD THEREOF

BACKGROUND OF THE INVENTION

The present invention relates to an IC card, and in particular to an IC card having such a structure that a program can be flexibly loaded from the outside onto a storage area.

Such IC cards that an operation program stored in an internal memory of each IC card is run on an internal processor and predetermined processing is executed can be classified into two kinds. In one of the two kinds, a nonrewritable memory such as a mask ROM (read only memory) is used as the internal memory. In the other of the two kinds, a writable memory such as a RAM (random access memory) backed up by a battery or an EEPROM (electrically erasable programmable read only memory) is used as the internal memory. The latter cards gradually tend to be widely used because the user can freely set contents of the operation program afterwards.

In accordance with invention disclosed in JP-A-63-6690, information relating to a value of final address of a region of a memory, in which a program down-loaded into an IC card by using a program of a control section of the IC card is stored, is stored into a system region of a data memory of the card, and (a plurality of) programs are down-loaded to the card to be made executable on the basis of the above described information. An identifier for identifying programs is assigned to each of the down-loaded programs. Further down-loading of a program having the same identifier is not allowed. For realizing the down-load, it is necessary to specify a program identifier included in the IC card and execute a command for clearing a program. When this scheme is used and a program to be down-loaded has an absolute address form, i.e., an address of a memory region of an IC card is directly indicated, therefore, the program producing apparatus must store therein the leading address of a memory within the card in which the program is stored, resulting in complicated program development.

Further, when a program already down-loaded must be modified or expanded, it is necessary to delete that program or it is necessary to down-load a new program after an identifier has been deleted or address information has been rewritten.

SUMMARY OF THE INVENTION

An object of the present invention is to provide an IC card having a system program for obtaining the need for a program producing apparatus (processor) or a compiler to store therein an absolute address on the memory of the IC card possessed by the product of the above described prior art, and to thereby facilitate developing, in the program producing apparatus, a program to be down-loaded.

Another object of the present invention is to eliminate the drawback that when a program already down-loaded must be modified or expanded, it is necessary to delete that program or to delete an identifier and rewrite address information and thereafter newly down-load a program, and to thereby provide an IC card facilitating partial modification of a program.

A further object of the present invention is to provide an IC card system, which allows selecting one out of two kinds of schemes, i.e., the relative address specification and absolute address specification at the time of down-loading, which, in case of relative address scheme, obviates the necessity of storing the program storage address and performing address management at the time of producing a down-load program, which, in case of absolute addressing, automatically corrects surplus and deficiency of memory capacity caused between the modified down-load program and the down-load program already written into the internal memory, which thus obviates the fear of overwriting a program on the already existing program included in the IC card and thereby destroying the program, and which raises the memory utilization efficiency by using the memory so that undesired space areas may be filled.

In accordance with configuration of an IC card of the present invention for achieving the above described objects, an internal processor of an IC card, in which an operation program is stored in an internal memory and predetermined processing is executed by the internal processor of the IC card on the basis of the above described operation program, has function of receiving a program from the outside of the IC card and storing the program thus received into the internal memory and function of checking, when a command specifying the storage address within the internal memory has been received, whether the required program or data is already present in the storage area or not, and of altering and relocating, in case the required program or data is already present, that program so as to meet space areas. When a program or data is not present in a region having the leading address and succeeding addresses, the operation program is stored in the specified address and succeeding addresses. When a command which does not specify the storage address of the internal memory is transmitted to the IC card, this internal processor searches a space area and stores that program therein.

Further, in accordance with the configuration of an IC card of the present invention for achieving the above described objects, an internal processor of the IC card, in which an operation program is stored in the internal memory and predetermined processing is executed by the internal processor on the basis of the above described operation program, has the function of receiving an operation program from the outside of the IC card and of storing the program into the internal memory at an address which is not accompanied by a specified storage address and which is specified by the internal processor. The IC card has a feature that the internal processor converts the absolute address written into the program to an address corresponding to the address specified by the internal processor.

In this way, it is possible to place writing in the operation program from the outside under the control of the internal processor and handle an instruction written in the absolute address form as if the program is written in the relative address form by adding an offset address to the absolute address in the internal processor. In case of later adjustment of a part of a program already loaded, for example, it is possible to modify that program by supplying an address from the outside and by handling the program as if the program is written in the absolute address form as in the prior art. If the number of steps of the program increases as a result of the later adjustment, succeeding programs are moved backward by the amount of the increase to perform relocation, and the destination address field of an instruction written in the absolute address form is corrected by adding, in the internal processor, the offset of the movement to the address.

In this way, it is possible to handle an operation program, which is produced in the absolute address form, when down-loading the operation program from an external apparatus without being conscious of the absolute address of the IC card memory or without being shackled by it. Further, in case a program already loaded is to be partly modified, only the required portion of the program is rewritten by means of absolute addresses and, if necessary, succeeding programs are relocated by the internal processor. Therefore, the development efficiency of the program down-loaded from the outside onto the IC card is raised. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Embodiments of the present invention will hereafter be described in detail by referring to the drawings.

Figure 1:
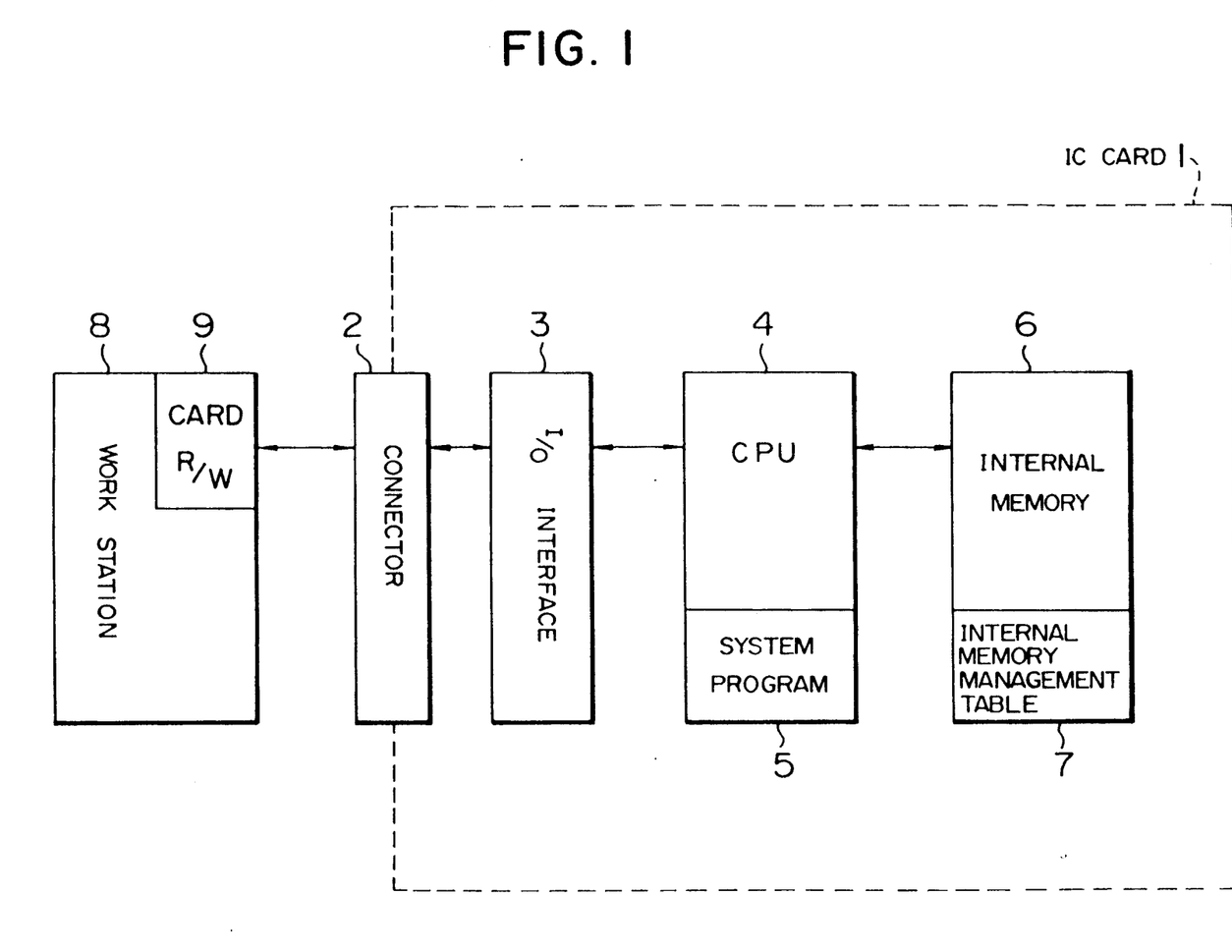
FIG. 1 is a block diagram showing an IC card and an external apparatus of an embodiment of the present invention.

FIG. 1 is a block diagram showing flow of a program and data transferred between an IC card of an embodiment according to the present invention and a work station. An IC card 1 is connected to a work station or an external apparatus 8 via a connector 2 and a card reader/writer 9. Input/output signals are transmitted from or received by a CPU 4 via an input/output interface 3. Basic function of the CPU 4 is controlled by a system program (loader) 5 written into an internal ROM. This system program implements I/O function with respect to the external apparatus 8, function of gaining access to an internal memory 6, and function of administering the arrangement of operation programs within the internal memory 6 by referring to an internal memory administration table 7.

Figure 2:
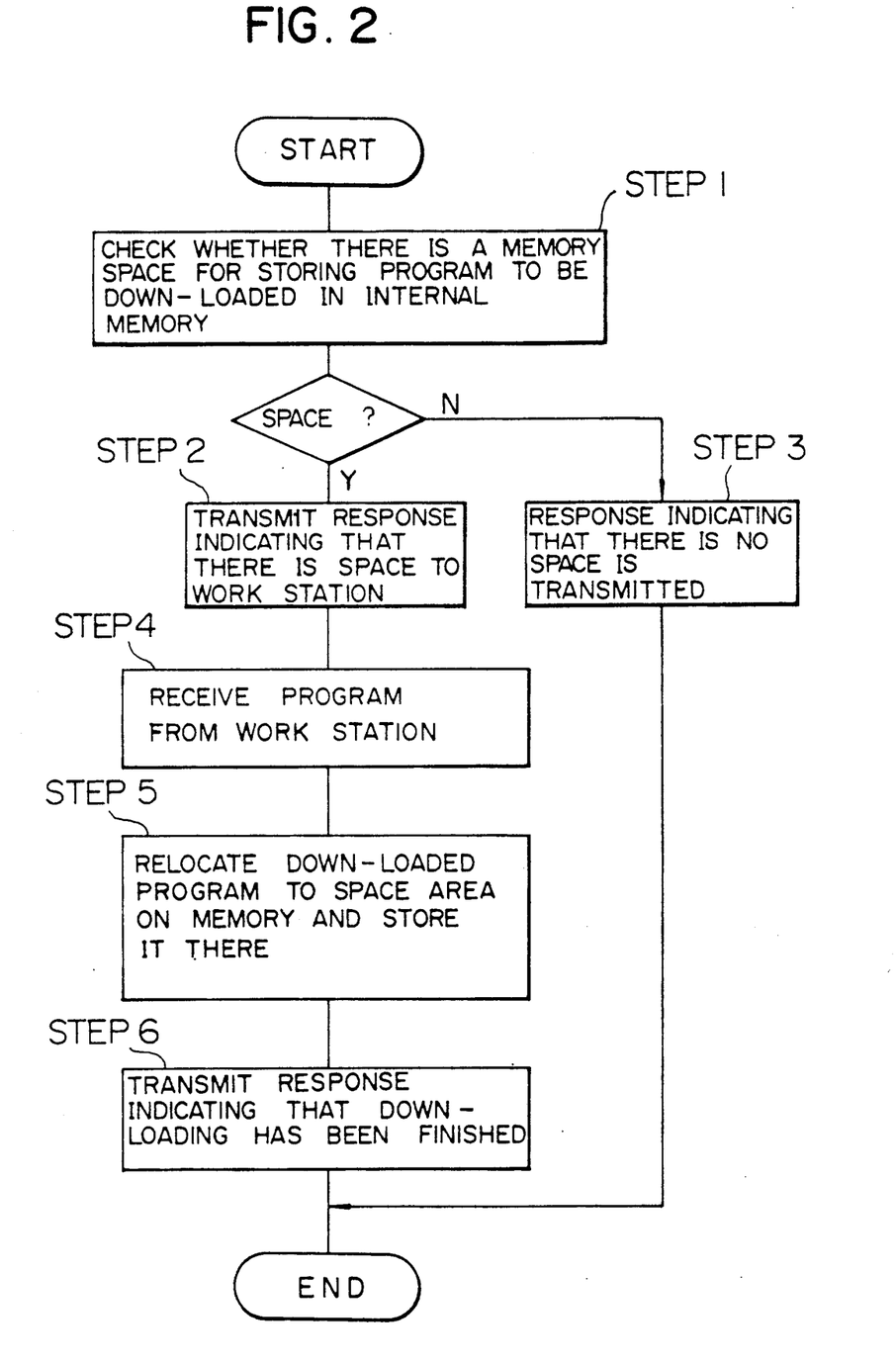
FIG. 2 is a flow chart showing the processing of a system program for down-loading a program onto the IC card.

Operation of this IC card will now be described. FIG. 2 is a flow chart showing the processing of the system program 5 for down-loading an object program, which is used for operation of the IC card. When the system program 5 is started, it first checks whether there is a space area for storing a program or not in the internal memory 6 included in the IC card 1. This check is performed by checking the internal memory administration table 7 stored in a part of the internal memory 6 (step 1). Divided storage of a relative address program makes address computation complicated. It is desirable that down-loading is performed only when a down-loaded program can be accommodated into a very large storage area, and otherwise a response that there is no space is transmitted to the work station or apparatus. When there is a space, a response indicating that there is a space is transmitted to the external apparatus 8, and reception of a program to be down-loaded is waited (step 2). The destination address field of a jump instruction included in the down-loaded program is converted into a value with an offset address added by the CPU 4 so that this program may become operable when it is stored into a space area of the internal memory 6 included in the IC card 1. The converted value is stored at the top of the space area (step 5). A response indicating that down-loading has been finished is transmitted from the IC card 1 to the external apparatus 8 (step 6). If there is not a space of required amount in the area at step 1, a response indicating that there is no space is transmitted to the external apparatus 8, and the processing is finished (step 3). A scheme for relocating and storing a program at the time of down-loading (step 5 in the flow chart of FIG. 2) will now be described in detail by referring to FIGS. 3 and 4.

Figure 3A:
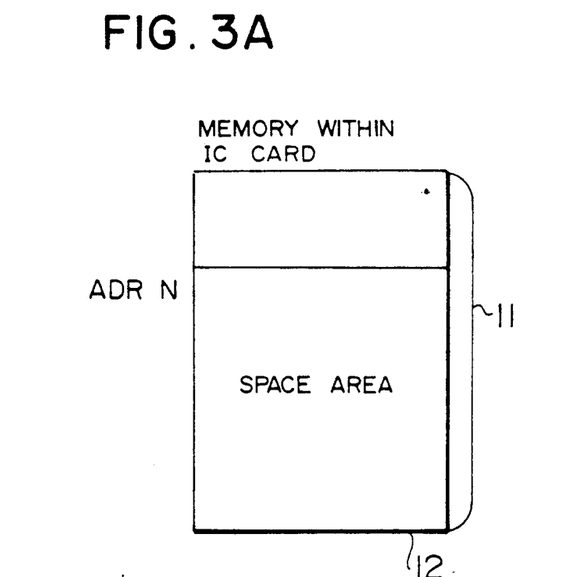
FIGS. 3A and 3B are memory map diagrams for describing in detail a scheme (step 5 of flow chart of FIG. 2) whereby a program is relocated and stored at the time of down-loading.
Figure 3B:
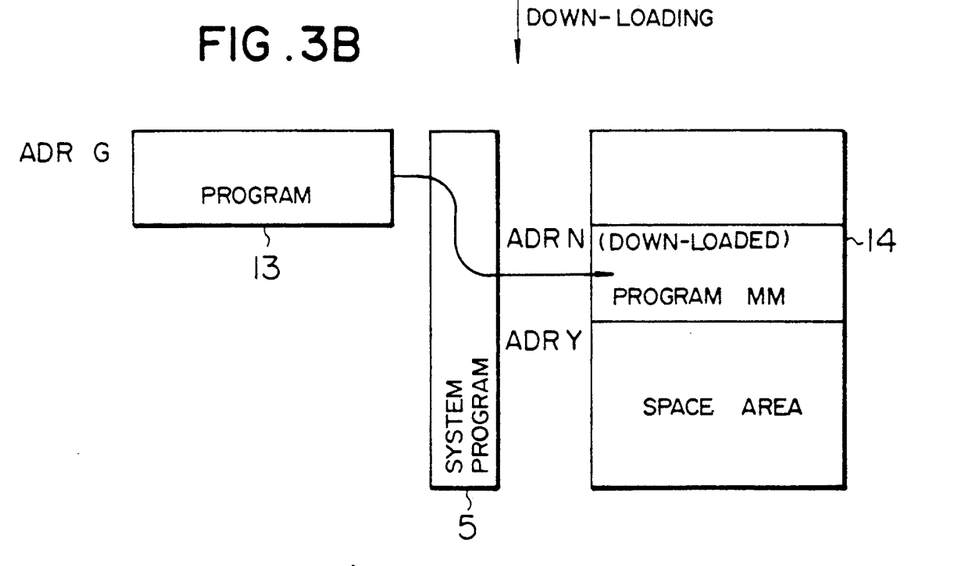

FIG. 3B shows down-load processing whereby the system program 5, which is the resident program of the IC card 1, inputs an object program 13 from the outside and stores the object program into a storage memory 11. The leading address of a space area 12 within the memory 11 obtained before the object program 13 is down-loaded is ADR N as shown in FIG. 3A. Further, it is now assumed that the leading address of the program obtained when the program 13 is produced by the external apparatus 13 is ADR G.

When executing down-loading, the system program 5 adds an offset or difference (ADR N)−(ADR G) obtained between the leading address ADR G of the inputted program 13 and the leading address ADR N of the space area 12 of the memory 11 to each of the operand address or absolute address of conditional or unconditional JMP instructions, a GO TO instruction, a CALL instruction, and a BRANCH instruction included in the program 13 having a certain data length. The system program 5 thus generates a down-loaded program MM 14 and stores this into the space area 12 having the leading address ADR N and succeeding addresses. The value of a new leading address ADR Y stored in the system program is equal to (ADR N)+(data length).

This conversion processing may be performed after the program 13 has been stored into the space area 12. Alternatively, the result of conversion performed in a different space area of the internal memory 6 may be stored into the space area 12. In other words, order of conversion and storage is arbitrary.

Figure 4:
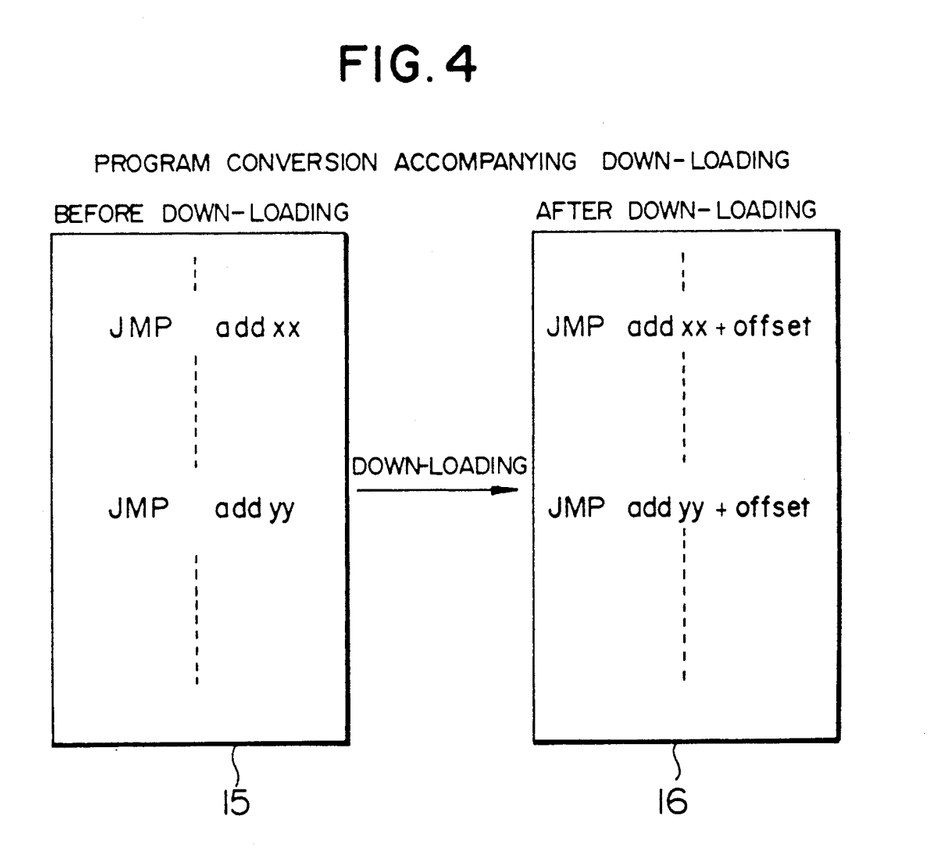
FIG. 4 is a diagram for describing instruction conversion performed within the relocated program.

FIG. 4 shows a state 15 of a program to be down-loaded before down-loading and a state 16 of the program after down-loading by using a jump (JMP) instruction. With regard to the offset value with respect to the space area, absolute addresses ADDXX and ADDYY of jump destination or address operand of a JMP instruction selected in accordance with the predetermined bit pattern of the operation code out of the instruction sequence before down-loading are respectively converted into addresses (ADDXX+offset) and (ADDYY+offset) and stored.

Another embodiment of the present invention will now be described by referring to FIGS. 5 and 6A to 6C.

Figure 5:
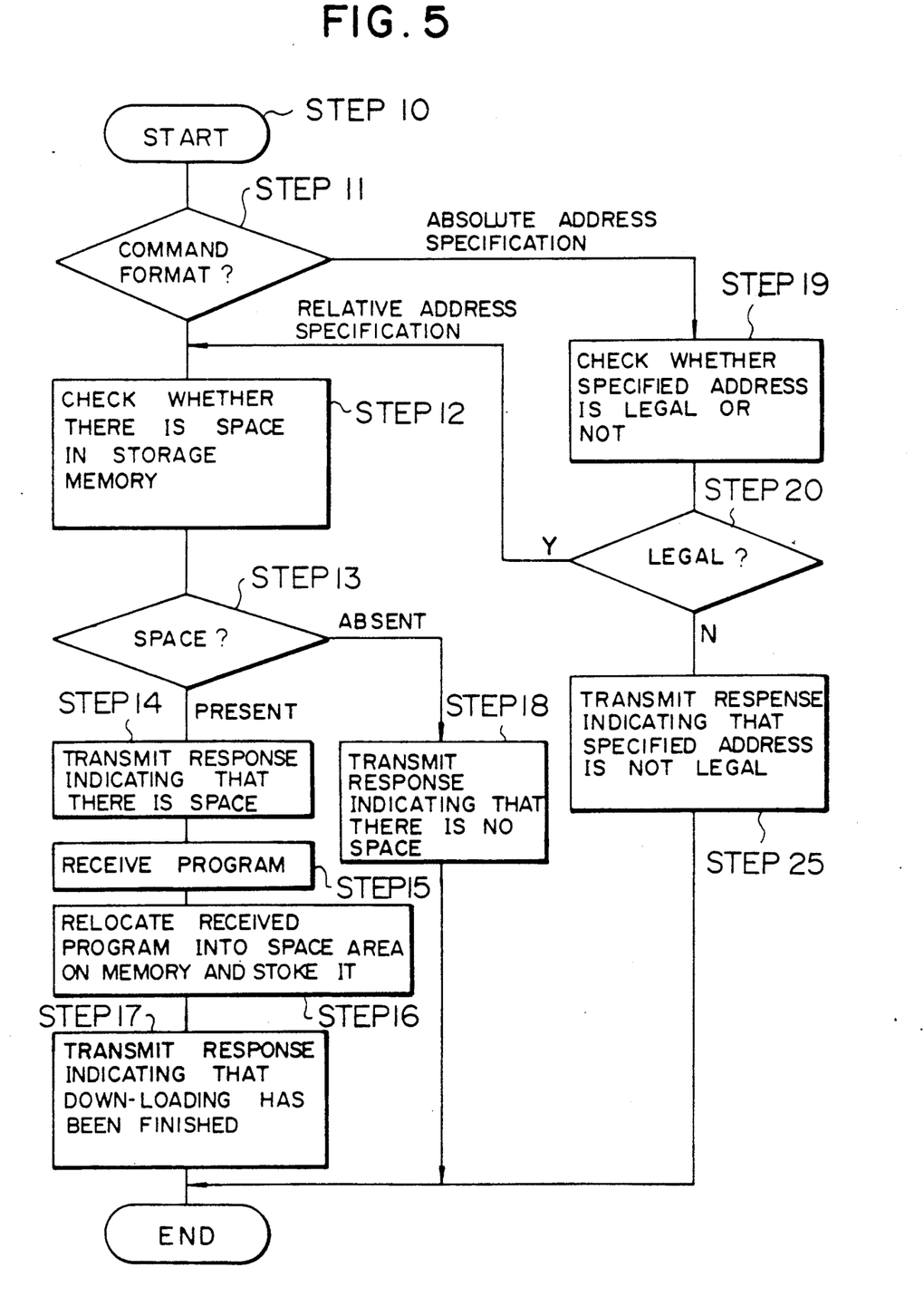
FIG. 5 is a flow chart showing processing of a system program for down-loading a program onto an IC card according to another embodiment of the present invention.
Figure 6A:
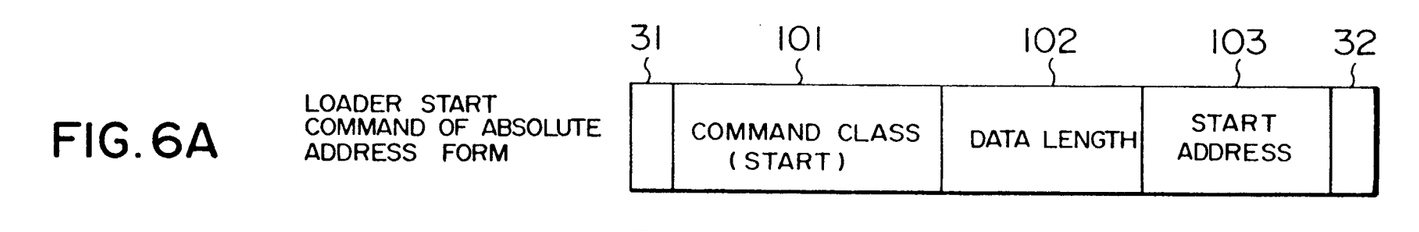
FIGS. 6A to 6C are diagrams for describing examples of a command train including a loader start command and a down-load program.
Figure 6B:
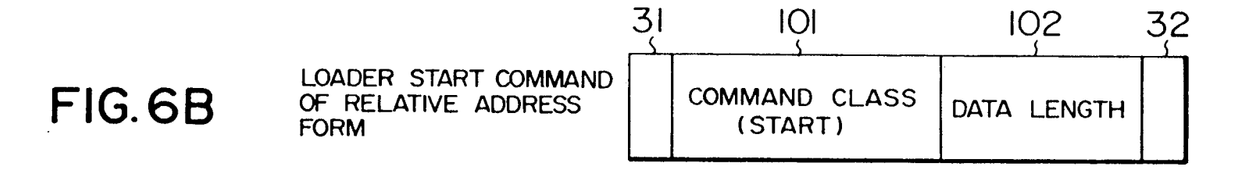
Figure 6C:
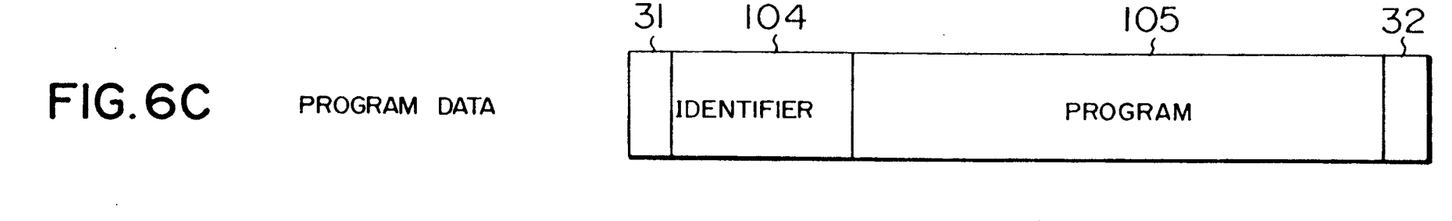
Figure 7A:
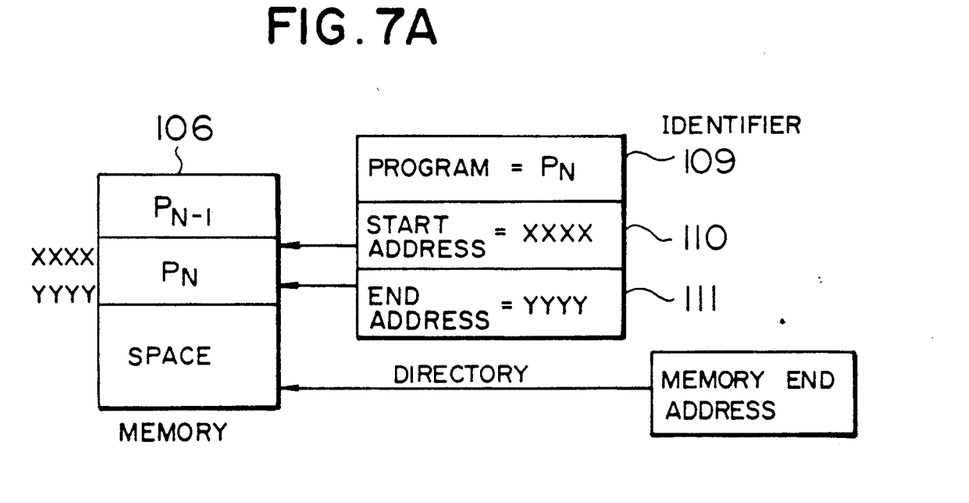
FIGS. 7A to 7C are diagrams for describing in detail a scheme whereby programs are relocated and stored at the time of down-loading.
Figure 7B:
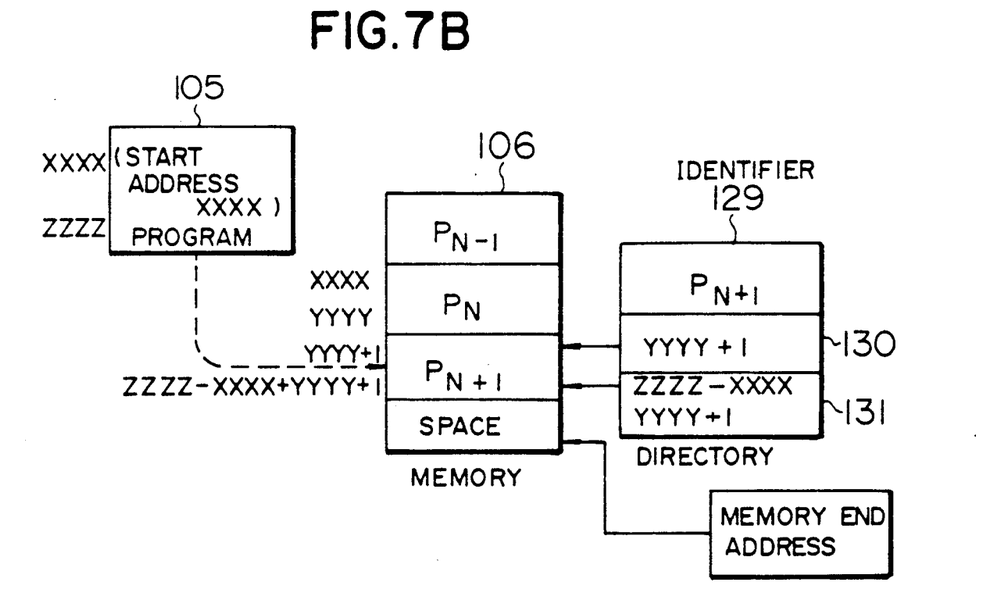
Figure 7C:
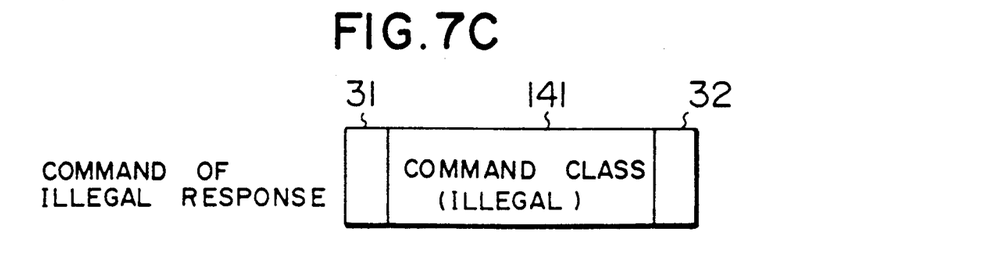

The hardware configuration for implementing this embodiment will not be described here, because it is the same as the hardware configuration of the first embodiment. In this embodiment, the system program 5 is started by a load start command which is supplied from the external apparatus 8 to make the system program of the IC card start down-loading and which is shown in FIG. 6A or 6B (step 10). The loader start command has a command class 101 and a data length 102 put between a master code 31 having a predetermined bit pattern and a step code 32. When the command class 101 of the loader start command has the format of FIG. 6B in which the relative address form is specified, the system program proceeds to step 12 (FIG. 5). When the absolute address form is specified, the system program proceeds to step 19 (step 11). If relative address specification is found at step 11, it is judged whether data can be stored into the program storage memory or not by comparing the data length 102 with the capacity of the space area (steps 12 and 13). In this judgment, the end address (YYYY) included in the directory as shown in FIG. 7A is subtracted from the last memory address held in the internal memory administration table. When the capacity of the space area thus found is equal to or larger than the data length, the program proceeds to step 14. When there is a space as a result of judgement, the program proceeds to step 14. When there is not a required amount of space, a response indicating that there is not a space is transmitted, and the program is finished (step 18). When there is a space, a response indicating that there is a space is transmitted (step 14). At step 15, a program is received by using a command train as shown in FIG. 6C. Programs are discriminated from each other by using an appended peculiar number (104). At step 16, a received program is stored closely at the top of a space area of an area 106. With respect to the program after storage, a directory is produced within the administration table on the basis of the data length 102, a start address 103, the identifier 104 and information of the space area within the IC card system program as shown in FIGS. 6A to 6C. As shown in FIG. 7B, the produced directory comprises an identifier 129, a start address 130 and an end address 131. At step 17, a response indicating that down-loading has been finished is transmitted. When the command class 101 indicates absolute address specification at step 11, it is possible to further insert a step for checking whether the specified address is legal or not on the basis of the data length 102 and the start address 103 of FIG. 6A (step 19). When the destination address of the jump instruction is within a range from the start address to the sum of the data length and the start address and is legal, the program proceeds to step 12. When the destination address is not legal, the program proceeds to step 25 (step 20). At step 25, a response indicating that the destiantion address is not legal is transmitted as shown in FIG. 7C.

Figure 8A:
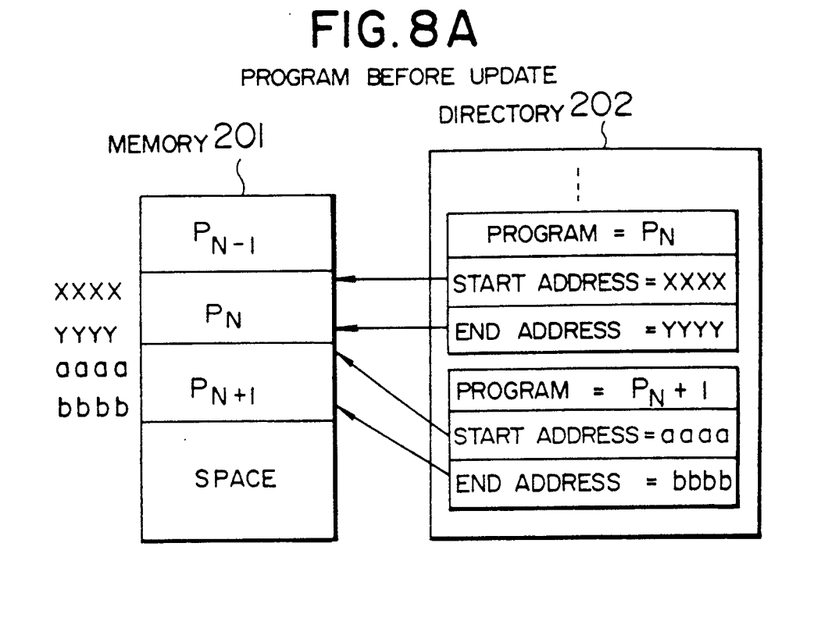
FIGS. 8A and 8B are diagrams for describing an example of the memory map in case memory relocation is performed by address correction.
Figure 8B:
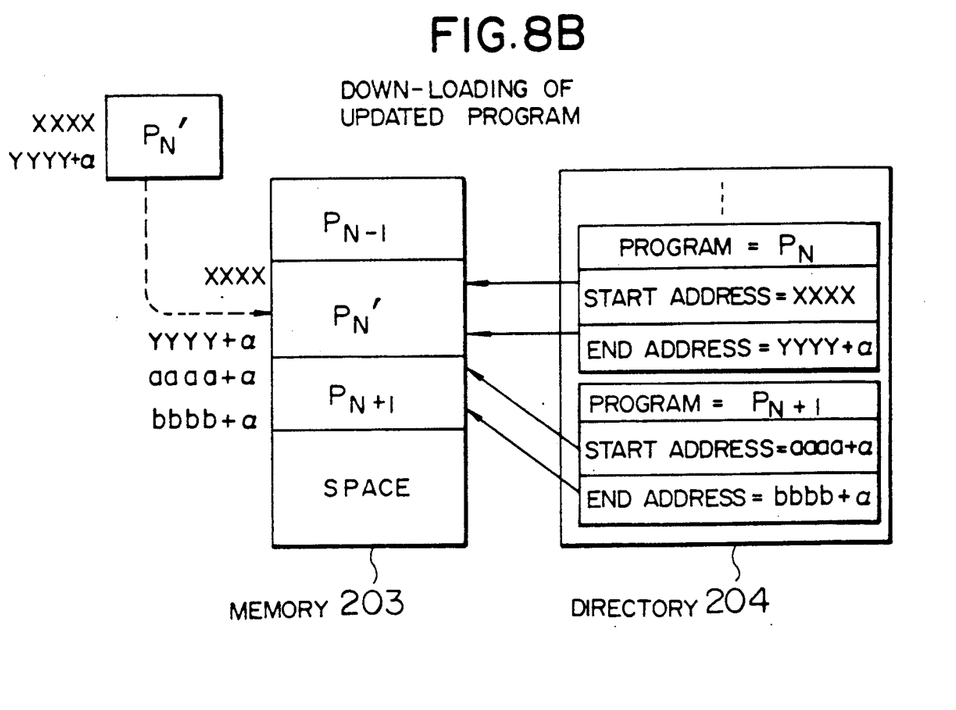

A third embodiment of the present invention will now be described by referring to FIGS. 8A and 8B. This embodiment also has the hardware configuration as shown in FIG. 1. When a program $P_N$ down-loaded onto a memory 201 is updated in the work station 8 and a program $P_N'$ having the number of steps changed is down-loaded onto the same memory area, the following problem occurs.

That is to say, in case the $P_N'$ is larger than the program $P_N$, the program $P_N'$ cannot be stored into the area of the previous program $P_N$. Further, in case the program $P_N'$ is smaller than the program $P_N$, a space is incurred in the area of the previous program $P_N$, resulting in a degraded memory efficiency. Although identifier $P_N = P_N'$, the program before alteration and that after alteration are represented by the absence and presence of a dash, respectively. Therefore, a difference (offset) $\alpha$ between the end address $(YYYY + \alpha)$ of the program $P_N'$ and the end address YYYY of the program $P_N$ is derived. This $\alpha$ is added to all of operand addresses of JMP instructions of the program $P_{N+1}$ following the program $P_N$ and succeeding programs, and the results are stored again (203). At the same time, a directory 202 for administering the area of the internal memory 6, in which the program $P_N$ is stored, is changed to a directory 204 so as to conform to the program $P_N'$. When programs are altered, it is thus possible to prevent other down-loaded programs from being destroyed and prevent the memory efficiency from being lowered.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

I claim:

1. An IC card, an operation program being stored into an internal memory of said IC card, predetermined processing being executed in an internal processor of said IC card, said IC card comprising:

(a) means for storing an operation program received from the outside of the IC card by said internal processor into said internal memory at an address specified by said internal processor;

(b) means for judging, when a storage destination address within said internal memory is specified in receiving the operation program, whether a program/data is present in a program storage region of the specified address and succeeding addresses or not; and (c) means for adding, upon presence of the program/data in said program storage region, difference between the leading address of a space area within said program storage region and said specified address to displacement of a jump instruction included in said operation program.

2. An IC card according to claim 1, further comprising means for discriminating, in receiving said operation program at said IC card, between a command specifying a storage destination address and a command which does not specify a storage destination address.

3. An IC card according to claim 2, wherein when a storage destiantion address of said internal memory is not specified from the outside in receiving said operation program at said IC card, said storage means stores said operation program into an address specified by said internal processor.

4. An IC card according to claim 1, comprising:
 means for receiving, in receiving said operation program, a command representing the data length of said operation program; and
 means for comparing the difference between the last address of said internal memory and the start address of the space area of said internal memory with said data length included in said command and for outputting, when said space area is smaller than said data length, a response command containing a code indicating that there is not enough space.

5. An IC card according to claim 1, further comprising:
 said adding means adding said difference between the leading address of said space area and said specified address to displacement of a conditional jump instruction and an unconditional jump instruction of said operation program; and
 means for relocating the program to a space area within said internal memory.

6. An IC card according to claim 1, further comprising means for, when said operation program is an object module of absolute address specification, detecting the fact that the destination address of a conditional/unconditional jump instruction within said operation program indicates inside of the range between the start address and the end address of said internal memory and for, otherwise, transmitting a response command indicating that the specified address is illegal.

7. An IC card according to claim 1, further comprising:
 means for detecting the fact that a program identifier appended to said operation program is the same as a program identifer within a directory used to administer programs included in said IC card; and
 means for overwriting, in response to the output of said detecting means, said operation program on the storage region of said program included in said internal memory according to said same identifier.

8. An IC card according to claim 1, wherein said internal processor comprises an internal ROM, in which a system program for down-loading said operation program onto said IC card is stored.

9. An IC card according to claim 3, wherein said internal memory stores therein an internal memory administration table.

10. An IC card according to claim 1, comprising means for converting the leading address of said operation program inputted to said IC card to a leading address of a space area of said internal memory and for storing said operation program into said internal memory.

11. An IC card according to claim 9, wherein said internal memory comprises means for storing an identifier for identifying a program and directory information including a start address and an end address of the program into said administration table.

12. A method for down-loading an operation program onto an internal memory included in an IC card, predetermined processing being executed in an internal processor on the basis of an operation program stored in said internal memory, said method comprising the steps of:
 receiving an operation program inputted to said IC card and storing said operation program into said internal memory at an address specified by said internal processor; and
 converting an absolute address written into an instruction included in said operation program so as to correspond to said address specified by said internal processor.

* * * * *